United States Patent
Cao et al.

(10) Patent No.: US 12,047,152 B2
(45) Date of Patent: Jul. 23, 2024

(54) MIMO TRANSMISSION METHOD AND SYSTEM, AND RECEIVER NODE

(71) Applicants: GUANGDONG OPPO MOBILE TELECOMMUNICATIONS CORP., LTD., Dongguan (CN); TSINGHUA UNIVERSITY, Beijing (CN)

(72) Inventors: Tian Cao, Beijing (CN); Hongming Zhang, Beijing (CN); Hui Yang, Beijing (CN); Jian Song, Beijing (CN); Jia Shen, Dongguan (CN); Jing Xu, Dongguan (CN)

(73) Assignees: GUANGDONG OPPO MOBILE TELECOMMUNICATIONS CORP., LTD., Dongguan (CN); TSINGHUA UNIVERSITY, Beijing (CN)

( * ) Notice: Subject to any disclaimer, the term of this patent is extended or adjusted under 35 U.S.C. 154(b) by 22 days.

(21) Appl. No.: 17/885,846

(22) Filed: Aug. 11, 2022

(65) Prior Publication Data
US 2022/0393751 A1    Dec. 8, 2022

Related U.S. Application Data

(63) Continuation of application No. PCT/CN2020/076272, filed on Feb. 21, 2020.

(51) Int. Cl.
    *H04B 7/08*     (2006.01)
    *H04B 7/0456*   (2017.01)
    *H04B 10/114*   (2013.01)

(52) U.S. Cl.
    CPC ......... *H04B 7/0842* (2013.01); *H04B 7/0456* (2013.01); *H04B 10/114* (2013.01)

(58) Field of Classification Search
    CPC .. H04B 7/0842; H04B 7/0456; H04B 10/114; H04B 10/1127; H04B 10/1129; H04B 10/1149; H04B 7/0413; H04B 10/116
    (Continued)

(56) References Cited

U.S. PATENT DOCUMENTS

| 5,347,289 A | * | 9/1994 | Elhardt | G01S 5/0247 |
|---|---|---|---|---|
| | | | | 701/530 |
| 2006/0251421 A1 | * | 11/2006 | Arnon | H04B 7/10 |
| | | | | 398/73 |

(Continued)

FOREIGN PATENT DOCUMENTS

| CN | 104980216 A | 10/2015 |
|---|---|---|
| CN | 107276671 A | 10/2017 |

(Continued)

OTHER PUBLICATIONS

International Search Report and Written Opinion dated Nov. 27, 2020 in International Application No. PCT/CN2020/076272. English translation attached.

(Continued)

*Primary Examiner* — Emmanuel Bayard
(74) *Attorney, Agent, or Firm* — Sheppard, Mullin, Richter & Hampton LLP (57) ABSTRACT

Embodiments of the present disclosure provide a MIMO communication method and system, and a receiver node. The method includes: receiving, by a number of optical detection modules of a receiver node, optical signals transmitted by a number of optical transmission modules of a transmitter node. Different optical detection modules of the receiver node have different orientations, and different optical transmission modules of the transmitter node have different orientations.

18 Claims, 3 Drawing Sheets

Receiving, by a number of optical detection modules of a receiver node, optical signals transmitted by a number of optical transmission modules of a transmitter node, different optical detection modules of the receiver node having different orientations, and different optical transmission modules of the transmitter node having different orientations — 201

(58) Field of Classification Search
USPC .......................... 375/267, 299, 346, 349, 355
See application file for complete search history.

(56) References Cited

U.S. PATENT DOCUMENTS

| | | |
|---|---|---|
| 2014/0064739 A1 | 3/2014 | Chen et al. |
| 2014/0304994 A1* | 10/2014 | Dumoulin ............ G02B 27/648 |
| | | 33/290 |
| 2016/0212510 A1* | 7/2016 | Bogoni ................. H04J 14/04 |
| 2017/0195051 A1* | 7/2017 | Yamamoto ........... G02B 6/4292 |
| 2018/0145416 A1* | 5/2018 | Cardullo ................ H01Q 9/16 |
| 2018/0217239 A1* | 8/2018 | Lee ....................... G01S 7/4876 |
| 2019/0257927 A1* | 8/2019 | Yao ....................... G01S 7/4815 |
| 2021/0226721 A1* | 7/2021 | Gao ...................... H04L 5/0005 |
| 2022/0163634 A1* | 5/2022 | Gorman ................ G01S 7/4816 |

FOREIGN PATENT DOCUMENTS

| | | |
|---|---|---|
| CN | 110535528 A | 12/2019 |
| WO | 2015082914 A1 | 6/2015 |

OTHER PUBLICATIONS

Zhang, Qi et al. "Design of Indoor Receiver Using Multiple-Input and Multiple-Output ACO-OFDM Visible Light Communication System", «Chinese Journal of Lasers» , vol. 47, No. 1, Jan. 31, 2020 (Jan. 31, 2020), entire document. Abstract Only.
European Search Report dated Mar. 14, 2023 received in European Patent Application No. EP20920045.0.

* cited by examiner

FIG. 1

Receiving, by a number of optical detection modules of a receiver node, optical signals transmitted by a number of optical transmission modules of a transmitter node, different optical detection modules of the receiver node having different orientations, and different optical transmission modules of the transmitter node having different orientations

MIMO TRANSMISSION METHOD AND SYSTEM, AND RECEIVER NODE

CROSS-REFERENCE TO RELATED APPLICATION

The present application is a continuation of International Application No. PCT/CN2020/076272, filed on Feb. 21, 2020, which is incorporated herein by reference in its entirety.

TECHNICAL FIELD

The embodiments of the present disclosure relate to visible light communication technology, and more particularly, to a Multiple Input Multiple Output (MIMO) communication method and system, and a receiver node.

BACKGROUND

Figure 1:
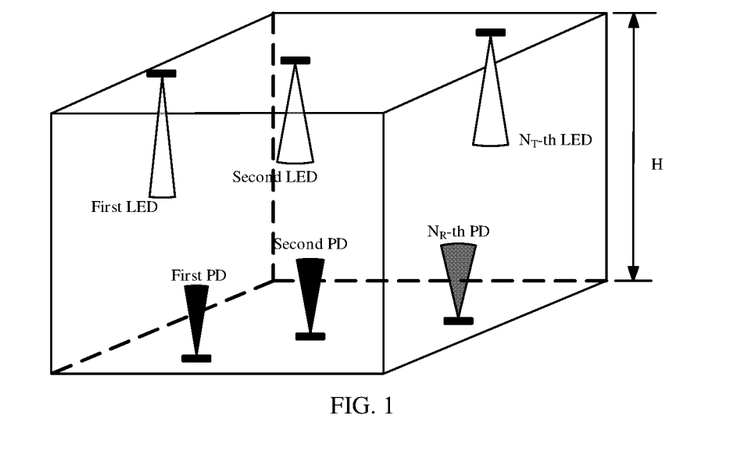
FIG. 1 is a schematic diagram of a MIMO architecture.

Visible light communication systems implement a MIMO architecture typically using an architecture of multi-point deployment of Light-Emitting Diodes (LED) and Photodetectors (PD). Referring to FIG. 1, multiple LEDs and multiple PDs are deployed at different positions in a room according to certain requirements, so as to achieve transmitting/receiving diversity and spatial multiplexing.

Although the above solution implements the MIMO architecture by deploying multiple LEDs and multiple PDs in different positions in the room to ensure that there is no overlapping area between links, it requires transmitters and receivers to be deployed separately (i.e., the multiple LEDs are deployed separately, and the multiple PDs are deployed separately), which is not conducive to unified processing of signals.

SUMMARY

The embodiments of the present disclosure provide a MIMO communication method and system, a receiver node, a chip, a computer-readable storage medium, a computer program product, and a computer program.

According to an embodiment of the present disclosure, a MIMO communication method is provided. The method includes: receiving, by a number of optical detection modules of a receiver node, an optical signal transmitted by a number of optical transmission modules of a transmitter node. Different optical detection modules of the receiver node have different orientations, and different optical transmission modules of the transmitter node have different orientations.

According to an embodiment of the present disclosure, a receiver node is provided. The receiver node includes: a number of optical detection modules configured to receive an optical signal transmitted by a number of optical transmission modules of a transmitter node. Different optical detection modules of the receiver node have different orientations, and different optical transmission modules of the transmitter node have different orientations.

According to an embodiment of the present disclosure, a MIMO communication system is provided. The system includes a transmitter node and the above receiver node. The transmitter node includes a number of optical transmission modules.

According to an embodiment of the present disclosure, a receiver node is provided. The receiver node includes a processor and a memory. The memory has a computer program stored thereon, and the processor is configured to invoke and execute the computer program stored in the memory to implement the above MIMO communication method.

According to an embodiment of the present disclosure, a chip is provided. The chip is configured to implement the above MIMO communication method.

In particular, the chip includes a processor configured to invoke and execute a computer program from a memory, to cause a device provided with the chip to implement the above MIMO communication method.

According to an embodiment of the present disclosure, a computer-readable storage medium is provided. The computer-readable storage medium has a computer program stored thereon. The computer program causes a computer to implement the above MIMO communication method.

According to an embodiment of the present disclosure, a computer program product is provided. The computer program product includes computer program instructions that cause a computer to implement the above MIMO communication method.

According to an embodiment of the present disclosure, a computer program is provided. The computer program, when executed by a computer, causes the computer to implement the above MIMO communication method.

With the above technical solutions, a number of optical transmission modules with different orientations are provided on a same transmitter node, and a number of optical detection modules with different orientations are provided on a same receiver node, thereby implementing a MIMO architecture between the transmitter node and the receiver node. Since the number of optical transmission modules are provided in one transmitter node in a centralized manner and the number of optical detection modules are provided in one receiver node in a centralized manner, it is conducive to unified processing of signals.

BRIEF DESCRIPTION OF DRAWINGS

The figures described here are used to provide a further understanding of the present disclosure and constitute a part of the present disclosure. The exemplary embodiments of the present disclosure and description thereof are used to explain the present disclosure, and do not constitute an improper limitation of the present disclosure.

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Visible light communication technology uses flickering signals emitted from light-emitting diodes to transmit information. Compared with the wireless local area network, the visible light communication system can use indoor lighting devices, instead of the wireless local area network, to transmit signals, and its communication speed can reach tens of megabits to hundreds of megabits per second, and the transmission speed may exceed the optical fiber communication in the future. A terminal with a signal receiving function (such as a computer, a mobile phone, a tablet, a wearable device, etc.), as long as it can receive the indoor light, can communicate with the light-emitting diodes. In the specific implementation, a microchip can be installed on a light-emitting diode to control the light-emitting diode to flicker millions of times per second, such that binary data can be quickly encoded into an optical signal and effectively transmitted through the light-emitting diode. The frequency of the flickering of the light-emitting diode is so high that the human eye cannot perceive it.

A visible light communication system typically uses multiple LEDs and multiple PDs to implement a MIMO architecture. Multiple channels (or links) are formed between the multiple LEDs and the multiple PDs, such that channel capacity can be improved.

Figure 2:
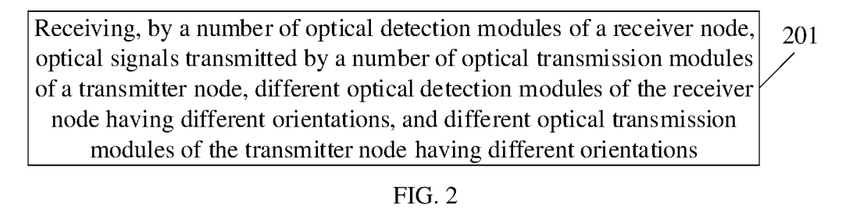
FIG. 2 is a schematic flowchart illustrating a MIMO communication method according to an embodiment of the present disclosure.

FIG. 2 is a schematic flowchart illustrating a MIMO communication method according to an embodiment of the present disclosure. As shown in FIG. 2, the MIMO communication method includes the following actions at blocks.

At block 201, a number of optical detection modules of a receiver node receive optical signals transmitted by a number of optical transmission modules of a transmitter node. Different optical detection modules of the receiver node have different orientations, and different optical transmission modules of the transmitter node have different orientations.

In this embodiment of the present disclosure, the transmitter node may also be referred to as a transmitter. The transmitter node includes a number of optical transmission modules, that is, the number of optical transmission modules are located in the same transmitter node, such that the transmitter node can perform unified control on the number of optical transmission modules, thereby allowing each of the number of optical transmission modules to transmit optical signals under the control.

In this embodiment of the present disclosure, the receiver node may also be referred to as a receiver. The receiver node includes a number of optical detection modules, that is, the number of optical detection modules are located in the same receiver node, such that the receiver node can perform unified processing of the optical signals received by the number of optical detection modules.

In the embodiment of the present disclosure, different optical transmission modules of the transmitter node have different orientations, and different optical detection modules of the receiver node have different orientations. In this way, overlapping links between the optical transmission modules and the optical detection modules can be avoided.

In an optional implementation, each of the number of optical transmission modules may have an adjustable orientation and/or an adjustable beam divergence angle. Further, each optical transmission module emits light uniformly within the beam divergence angle. Here, the orientation of the optical transmission module refers to a center direction of the optical signal transmitted by the optical transmission module, and the beam divergence angle of the optical transmission module refers to a beam divergence angle of the optical signal transmitted by the optical transmission module.

In an optional implementation, each of the number of optical detection modules may have an adjustable orientation and/or an adjustable field angle. Here, the orientation of the optical detection module refers to a central direction of the optical signal received by the optical detection module, and the field angle of the optical detection module refers to a field angle of the optical signal received by of the optical detection module.

In an optional implementation, the optical transmission module may be a LED, and the optical detection module may be a PD. The present disclosure is not limited to these examples, and the optical transmission module can be implemented by other light emitting devices, such as fluorescent lamps. The optical detection module can also be implemented by other light sensing devices.

Figure 3:
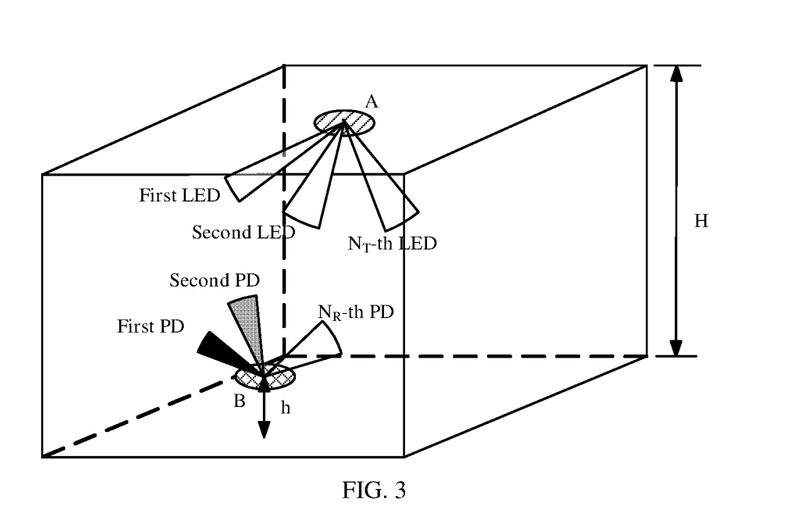
FIG. 3 is a schematic diagram showing an indoor visible light MIMO system according to an embodiment of the present disclosure.

Referring to FIG. 3, which is a schematic diagram of an indoor visible light communication system (here, each optical transmission module is an LED, and each optical detection module is a PD as an example), a transmitter node includes a number of LEDs, and a receiver node includes a number of PDs. The orientation angles of the LEDs and the orientation angles of the PDs can be adjusted to form a MIMO architecture. The cube in FIG. 3 represents a room with a height of H meters, and the transmitter node is located at Point A on the ceiling and is equipped with $N_T$ LEDs with arbitrary orientations. The orientation of each LED can be adjusted freely, and each LED is equipped with a lampshade, such that the beam divergence angle of the LED can be adjusted and the LED can emit light uniformly within the beam divergence angle. In an actual deployment, the orientation and beam divergence angle of one single LED can be adjusted according to communication requirements and lighting requirements. The receiver node is located at Point B at a height of h meters from the ground, and is equipped with $N_R$ PDs with arbitrary orientations. The orientations and field angles of each PD can also be adjusted according to communication requirements. Since the orientations of the LEDs in the transmitter node and PDs in the receiver node can be set and changed, the orientations of different LEDs can be set to be different, and the orientations of different PDs can also be set to be different, such that an ill-conditioned channel gain matrix between the transmitter node and the receiver node can be avoided. The transmitting diversity gain and the receiving diversity gain can be obtained with the MIMO architecture of the above indoor visible light communication system (referred to as indoor visible light MIMO system for short). In addition, due to the difference in the orientation angles of the links between the LEDs and the PDs (that is, the orientation of the LED may not be exactly opposite to the orientation of the PD), the links between them are independent of each other, and the channel capacity between any pair of LED and PD in the indoor visible light MIMO system can be improved by means of multiplexing.

In an embodiment of the present disclosure, the optical signals received by the number of optical detection modules of the receiver node may be a first signal, and the optical signals transmitted by the number of optical transmission modules of the transmitter node may be a second signal. Here, it is to be noted that each optical transmission module will transmit one optical signal, and the optical signals transmitted by the number of transmission modules are collectively referred to as the second signal, which can be represented by a vector s. Each optical detection module will receive one optical signal, and the optical signals received by the number of optical detection modules are collectively referred to as the first signal, which can be represented by a vector y.

In an optional implementation of the present disclosure, the receiver node may determine channel gain information between the receiver node and the transmitter node, and determine a relationship between the first signal and the second signal based on the channel gain information. Here, the channel gain information may be a channel gain matrix, and how to determine the channel gain matrix will be described below with reference to a specific algorithm.

The receiver node may determine the channel gain matrix between the receiver node and the transmitter node as:

$$H = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{N_R1} & h_{N_R2} & \cdots & h_{N_RN_T} \end{bmatrix}, \quad (1)$$

where H represents the channel gain matrix, an element $h_{ij}$ in H represents a channel gain value between a j-th optical transmission module of the number of optical transmission modules and an i-th optical detection module of the number of optical detection modules, $1 \leq j \leq N_T$ and j is an integer, and $1 \leq i \leq N_R$ and i is an integer, $N_T$ represents the number of optical transmission modules, and $N_R$ represents the number of optical detection modules.

Referring to FIG. 3, the receiver node in the indoor visible light MIMO system includes $N_R$ PDs, the transmitter node includes $N_T$ LEDs, and the channel gain matrix between the receiver node and the transmitter node can be expressed as the above Equation (1).

In an embodiment of the present disclosure, the element $h_{ij}$ in the channel gain matrix may be determined in any of the following schemes.

1) Scheme 1

When the links between the receiver node and the transmitter node are all LoS links, the element $h_{ij}$ in the channel gain matrix can be determined as:

$$h_{ij} = \begin{cases} \dfrac{1 - |\vec{AB}|\left(|\vec{AB}|^2 + \dfrac{S_{Ri}\cos\xi_{Ri}}{\pi}\right)^{-1/2}}{1 - \cos\dfrac{\beta_{Tj}}{2}} & \xi_{Tj} \leq \dfrac{\beta_{Tj}}{2} \text{ and } \xi_{Ri} \leq \dfrac{\beta_{Ri}}{2}, \\ 0 & \text{else} \end{cases} \quad (2)$$

where $\vec{AB}$ represents a vector from Point A to Point B, Point A being a position of the j-th optical transmission module and Point B being a position of the i-th optical detection module, $|\vec{AB}|$ represents a modulus length of $\vec{AB}$, $S_{Ri}$ represents a detection area of the i-th optical detection module, $\xi_{Tj}$ represents an angle between $\vec{AB}$ and $\vec{e}_{Tj}$, $\xi_{Ri}$ represents an angle between $\vec{e}_{Ri}$ and $\vec{BA}$, $\vec{e}_{Tj}$ represents an unit vector in an orientation of the j-th optical transmission module, $\vec{e}_{Ri}$ represents an unit vector in an orientation of the i-th optical detection module, $\beta_{Tj}$ represents a beam divergence angle of the j-th optical transmission module, and $\beta_{Ri}$ represents a field angle of the i-th optical detection module.

Figure 4:
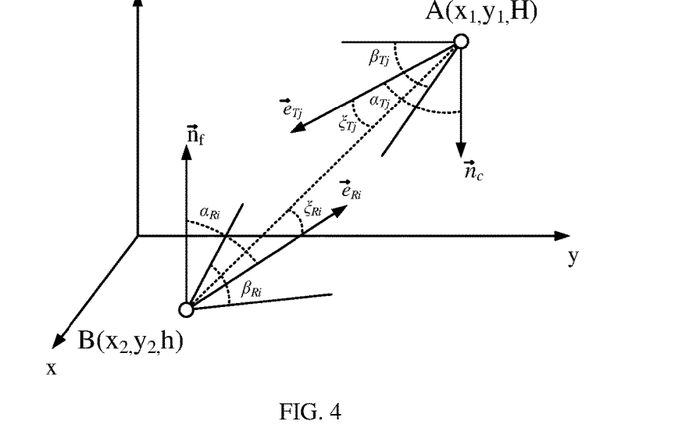
FIG. 4 is a schematic diagram showing a Line-of-Sight (LoS) link between an LED and a PD according to an embodiment of the present disclosure.

Referring to FIG. 3, the receiver node in the indoor visible light MIMO system includes $N_R$ PDs, and the transmitter node includes $N_T$ LEDs. When the links between the PDs and the LEDs are all LoS links, the element $h_{ij}$ in the channel gain matrix can be calculated as shown in FIG. 4. FIG. 4 shows a schematic diagram showing a direct link (i.e., the LOS link) between any LED (e.g., the j-th LED among the $N_T$ LEDs) and a PD (e.g., the i-th PD among the $N_R$ PDs). The LED is located at the position of Point A on the ceiling, and has coordinates of $(x_1, y_1, H)$. The normal vector of the ceiling is vertically downward, and is set to $\vec{n}_c$. The unit vector in the orientation of the LED is set to $\vec{e}_{Tj}$, and the LED has a beam divergence angle set to $\beta_{Tj}$, and emits light uniformly. The angle between $\vec{n}_c$ and $\vec{e}_{Tj}$ is set to $\alpha_{Tj}$. PD is located at Point B, which is h meters high from the ground and has coordinates of $(x_2, y_2, h)$. The normal vector of the ground is set to $\vec{n}_f$. The unit vector in the orientation of the PD is set to $\vec{e}_{Ri}$, and has a field angle of $\beta_{Ri}$. The angle between $\vec{n}_f$ and $\vec{e}_{Ri}$ is set to $\alpha_{Ri}$. Then, $\vec{n}_c=(0,0,-1)$ and $\vec{n}_f=(0,0,1)$. Meanwhile, assuming that the azimuths of the LED and the PD are $\varphi_{Tj}$ and $\varphi_{Ri}$, respectively, then $\vec{e}_{Tj}$ and $\vec{e}_{Ri}$ can be written as:

$$\vec{e}_{Tj}=(\sin\alpha_{Tj}\cos\varphi_{Tj},\sin\alpha_{Tj}\sin\varphi_{Tj},-\cos\alpha_{Tj}) \quad (3\text{-}1)$$

$$\vec{e}_{Ri}=(\sin\alpha_{Ri}\cos\varphi_{Ri},\sin\alpha_{Ri}\sin\varphi_{Ri},\cos\alpha_{Ri}) \quad 3\text{-}2)$$

The channel gain $h_{ij}$ between the LED and the PD can be expressed as the above Equation (2). Accordingly, $S_{Ri}$ represents a detection area of the PD.

In the above Equation (2), $\vec{AB}$ represents a vector from Point A to Point B, $\xi_{Tj}$ represents an angle between $\vec{AB}$ and $\vec{e}_{Tj}$, $\xi_{Ri}$ represents the angle between $\vec{e}_{Ri}$ and $\vec{BA}$, and the relationships between them can be expressed as follows:

$$\vec{AB} = (x_2 - x_1, y_2 - y_1, h - H), \quad (4\text{-}1)$$

$$\vec{AB} = -\vec{BA}, \quad (4\text{-}2)$$

$$\xi_{Tj} = \arccos\left(\dfrac{\vec{e}_{Tj} \cdot \vec{AB}}{|\vec{e}_{Tj}||\vec{AB}|}\right), \quad (4\text{-}3)$$

$$\xi_{Ri} = \arccos\left(\dfrac{\vec{e}_{Ri} \cdot \vec{BA}}{|\vec{e}_{Ri}||\vec{BA}|}\right). \quad (4\text{-}4)$$

2) Scheme 2

If the links between the receiver node and the transmitter node are all non-LoS links (that is, there is no LoS link between the receiver node and the transmitter node), the element $h_{ij}$ in the channel gain matrix can be determined as:

$$h_{ij} = \sum_{k=1}^{K} \int_{0}^{+\infty} h_{ij}^{(k)}(t; S, R) dt, \quad (5)$$

where $h_{ij}^{(k)}(t;S,R)$ represents an impulse response component of a k-th reflection from a light source S to a receiving end R, and K represents a total number of reflections. The light source S refers to the j-th optical transmission module, and the receiving end R refers to the i-th optical transmission module.

Further, the impulse response component of the k-th reflection from the j-th optical transmission module to the i-th optical detection module may be:

$$h_{ij}^{(k)}(t; S, R) = \sum_{l=1}^{N} \rho h_{ij}^{(k-1)}(t; S, \varepsilon_l^r)^* h_{ij}^{(0)}(t; \varepsilon_l^s, R), \quad (6)$$

where $h_{ij}^{(k-1)}(t;S,\varepsilon_l^r)$ represents an impulse response of a (k−1)-th reflection from the light source S to a reflection surface element $\varepsilon_l^r$, $h_{ij}^{(0)}(t;\varepsilon_l^s,R)$ represents an impulse response of an LoS link from a reflection surface element $\varepsilon_l^s$ to the receiving end R, ρ represents an average reflectivity of the reflection surface elements, and N represents a total number of reflection surface elements.

Referring to FIG. 3, the receiver node in the indoor visible light MIMO system includes $N_R$ PDs, and the transmitter node includes $N_T$ LEDs. When the links between the PDs and the LEDs are all non-LoS links, the element $h_{ij}$ in the channel gain matrix can be calculated using a diffuse reflection model formed by indoor walls and furniture. The establishment method of the diffuse reflection model depends on the internal structure of the room, and the channel gain value is simulated and calculated by the ray tracing method. In the simulation algorithm, all surfaces in the room, including walls and furniture, are discretized into small surface elements (referred to as dispersive surface elements). It is assumed that they are divided into N dispersive surface elements $\varepsilon_l$ (1≤l≤N) in total, and each dispersive surface element has both functions of transmitting and receiving, serving as both the receiving end of the (k−1)-th reflection and the transmitting end of the k-th reflection. The expression of the impulse response component of the k-th reflection from the light source S (i.e., the j-th optical transmission module) to the receiving end R (i.e., the i-th optical detection module) is the above Equation (6), where l is a subscript for the dispersive surface element. Each dispersive surface element is used as the transmitting end of the k-th reflection. According to the spatial geometric relationship, the impulse response $h_{ij}^{(k-1)}(t;S,\varepsilon_l^r)$ of the (k−1)-th reflection from the light source S to each dispersive surface element $\varepsilon_l^r$ and the impulse response $h_{ij}^{(0)}(t;\varepsilon_l^s,R)$ of the LoS link from each dispersive surface element $\varepsilon_l^s$ to the receiving end R can be convolved to obtain the impulse response component of the k-th reflection from the light source S to the receiving end R. In this way, by means of iterations, the first reflection component, the second reflection component, . . . , and the K-th reflection component can be obtained from the direct transmission component. Finally, after integrating and summing the channel responses of K reflections, the expression of the link gain value can be obtained as the above Equation (5).

It is to be noted that, in the case where some of the links between the transmitter node and the receiver node are LoS links and others are non-LoS links, only the optical transmission modules and the optical detection modules having all the links therebetween being LoS links can be selected to form a MIMO system, to avoid an ill-conditioned channel gain matrix. Accordingly, in this case, the element $h_{ij}$ in the channel gain matrix can be calculated with reference to the above Scheme 1.

It is to be noted that the LoS link in the above schemes may also be referred to a direct link, and the non-LoS link in the above schemes may also be referred to as a non-direct link or a scattering link. An LoS link means that the transmitting end of the link is an optical transmitter module, and the receiving end of the link is an optical detection module. A non-LoS link means that the transmitting end or the receiving end of the link is a reflection surface element.

After the receiver node determines the channel gain matrix using any of the above schemes, the relationship between the first signal and the second signal can be determined based on the channel gain matrix as:

$$y = Hs + n, \quad (7)$$

where n represents a white Gaussian noise vector, y represents the first signal, s represents the second signal, and H represents the channel gain matrix.

Referring to FIG. 3, the receiver node in the indoor visible light MIMO system includes $N_R$ PDs, and the transmitter node includes $N_T$ LEDs. The optical signal transmitted by the $N_T$ LEDs are represented by a vector s, and the optical signal received by the $N_R$ PDs are represented by a vector y. The relationship between the vector s and the vector y, i.e., the communication link model, can be expressed as the above Equation (7).

In an optional embodiment, the receiver node may demodulate the first signal by using a minimum mean square error method, to obtain a demodulated signal as:

$$\hat{x} = Wy, \quad (8)$$

where $\hat{x}$ represents the demodulated signal, W represents a demodulation weight matrix, and y represents the first signal.

Here, the demodulation weight matrix is:

$$W = (H^T H + \sigma^2 I)^{-1} H^T, \quad (9)$$

where H represents the channel gain matrix, $\sigma^2$ represents a variance of n, and I is an identity matrix.

The technical solutions of the embodiments of the present disclosure propose to provide optical transmission modules with different orientations on a same transmitter node, and provide optical detection modules with different orientations on a same receiver node, so as to implement a MIMO architecture between the transmitter node and the receiver node. In the present disclosure, a number of optical transmission modules are provided in one transmitter node and a number of optical detection modules are provided in one receiver node, respectively, in a centralized manner, which is conducive to unified processing of signals. In addition, the present disclosure provides a method for calculating the channel gain matrix based on the MIMO architecture. After the channel gain matrix is obtained, the channel gain matrix can be used to perform diversity and multiplexing processing on the signals.

Figure 5:
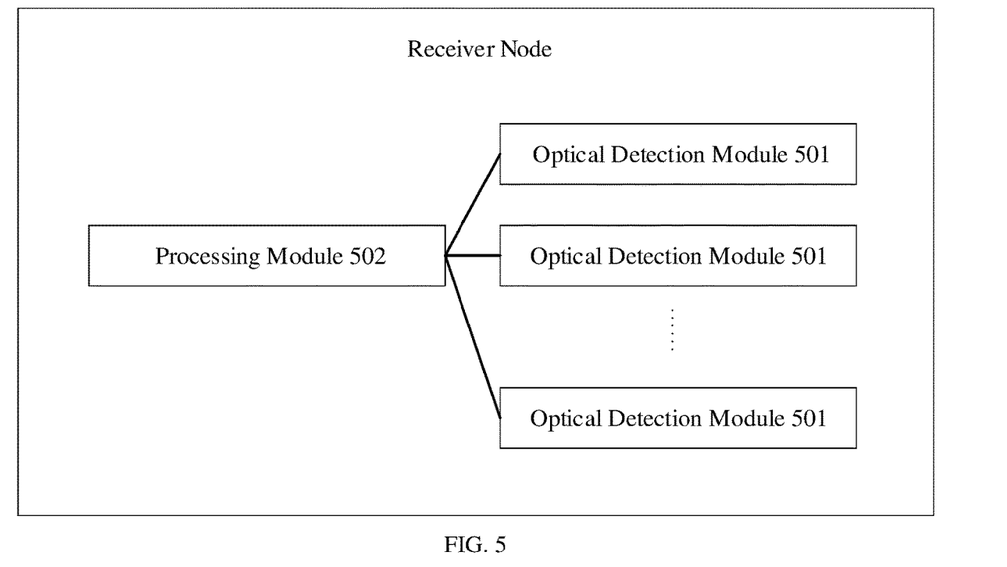
FIG. 5 is a schematic diagram showing a structure of a receiver node according to an embodiment of the present disclosure.

FIG. 5 is a schematic diagram showing a structure of a receiver node according to an embodiment of the present disclosure. As shown in FIG. 5, the receiver node includes:

a number of optical detection modules 501 configured to receive an optical signal transmitted by a number of optical transmission modules of a transmitter node. Different optical detection modules of the receiver node have different orientations, and different optical transmission modules of the transmitter node have different orientations.

In an optional implementation, the optical signal received by the number of optical detection modules 501 of the receiver node may be a first signal, and the optical signal transmitted by the number of optical transmission modules of the transmitter node may be a second signal.

The receiver node may further include a processing module 502 configured to determine channel gain information between the receiver node and the transmitter node, and determine a relationship between the first signal and the second signal based on the channel gain information.

In an optional implementation, the processing module 502 may be configured to determine a channel gain matrix between the receiver node and the transmitter node as:

$$H = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{N_R1} & h_{N_R2} & \cdots & h_{N_RN_T} \end{bmatrix},$$

where H represents the channel gain matrix, an element $h_{ij}$ in H represents a channel gain value between a j-th optical transmission module of the number of optical transmission modules and an i-th optical detection module of the number of optical detection modules, $1 \le j \le N_T$ and j is an integer, and $1 \le i \le N_R$ and i is an integer, $N_T$ represents the number of optical transmission modules, and $N_R$ represents the number of optical detection modules.

In an optional implementation, the processing module 502 may be configured to determine the element $h_{ij}$ in the channel gain matrix as:

$$h_{ij} = \begin{cases} \dfrac{1 - |\vec{AB}| \left( |\vec{AB}|^2 + \dfrac{S_{Ri}\cos\xi_{Ri}}{\pi} \right)^{-1/2}}{1 - \cos\dfrac{\beta_{Tj}}{2}} & \xi_{Tj} \le \dfrac{\beta_{Tj}}{2} \text{ and } \xi_{Ri} \le \dfrac{\beta_{Ri}}{2} \\ 0 & \text{else} \end{cases}$$

where $\vec{AB}$ represents a vector from Point A to Point B, Point A being a position of the j-th optical transmission module and Point B being a position of the i-th optical detection module, $|\vec{AB}|$ represents a modulus length of $\vec{AB}$, $S_{Ri}$ represents a detection area of the i-th optical detection module, $\xi_{Tj}$ represents an angle between $\vec{AB}$ and $\vec{e}_{Tj}$, $\xi_{Ri}$ represents an angle between $\vec{e}_{Ri}$ and $\vec{BA}$, $\vec{e}_{Tj}$ represents an unit vector in an orientation of the j-th optical transmission module, $\vec{e}_{Ri}$ represents an unit vector in an orientation of the i-th optical detection module, $\beta_{Tj}$ represents a beam divergence angle of the j-th optical transmission module, and $\beta_{Ri}$ represents a field angle of the i-th optical detection module.

In an optional implementation, links between the receiver node and the transmitter node may be all Line-of-Sight (LoS) links.

In an optional implementation, the processing module 502 may be configured to determine the element $h_{ij}$ in the channel gain matrix as:

$$h_{ij} = \sum_{k=1}^{K} \int_0^{+\infty} h_{ij}^{(k)}(t; S, R) dt,$$

where $h_{ij}^{(k)}(t;S,R)$ represents an impulse response component of a k-th reflection from a light source S to a receiving end R, and K represents a total number of reflections, the light source S being the j-th optical transmission module, and the receiving end R being the i-th optical transmission module.

In an optional implementation, the impulse response component of the k-th reflection from the j-th optical transmission module to the i-th optical detection module may be:

$$h_{ij}^{(k)}(t; S, R) = \sum_{l=1}^{N} \rho h_{ij}^{(k-1)}(t; S, \varepsilon_l^r) * h_{ij}^{(0)}(t; \varepsilon_l^s, R),$$

where $h_{ij}^{(k-1)}(t;S,\varepsilon_l^r)$ represents an impulse response of a (k−1)-th reflection from the light source S to a reflection surface element $\varepsilon_l^r$, $h_{ij}^{(0)}(t;\varepsilon_l^s, R)$ represents an impulse response of an LoS link from a reflection surface element $\varepsilon_l^s$ to the receiving end R, $\rho$ represents an average reflectivity of the reflection surface elements, and N represents a total number of reflection surface elements.

In an optional implementation, links between the receiver node and the transmitter node may be all non-Line-of-Sight (non-LoS) links.

In an optional implementation, the processing unit 502 may be configured to determine, based on the channel gain information, the relationship between the first signal and the second signal as:

$y=Hs+n,$ where n represents a white Gaussian noise vector, y represents the first signal, s represents the second signal, and H represents the channel gain matrix.

In an optional implementation, the processing unit 502 may be further configured to demodulate the first signal to obtain a demodulated signal as:

$\hat{x}=Wy,$ where $\hat{x}$ represents the demodulated signal, W represents a demodulation weight matrix, and y represents the first signal.

In an optional implementation, the demodulation weight matrix may be:

$W=(H^TH+\sigma^2 I)^{-1}H^T,$ where H represents the channel gain matrix, $\sigma^2$ represents a variance of n, and I is an identity matrix.

In an optional implementation, each of the number of optical transmission modules may have an adjustable orientation and/or an adjustable beam divergence angle.

In an optional implementation, each of the number of optical detection modules may have an adjustable orientation and/or an adjustable field angle.

In an optional implementation, each optical transmission module may be a light emitting diode, and each optical detection module may be a photodetector.

It can be appreciated by those skilled in the art that, for the above receiver node according to the embodiment of the present disclosure, reference can be made to the relevant description of the MIMO communication method according to the embodiment of the present disclosure.

In a specific implementation, the processing module in the receiver node according to the embodiment of the present disclosure may be implemented by a processor. The optical detection module in the above receiver node according to the embodiment of the present disclosure may be implemented by a PD.

Figure 6:
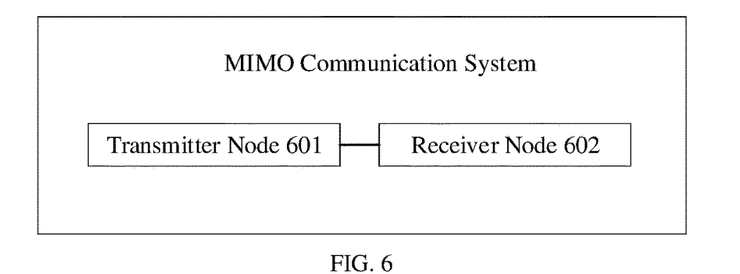
FIG. 6 is a schematic diagram showing a structure of a MIMO communication system according to an embodiment of the present disclosure.

FIG. 6 is a schematic diagram showing a structure of a MIMO communication system according to an embodiment of the present disclosure. As shown in FIG. 6, the MIMO communication system includes: a transmitter node 601, which includes a number of optical transmission modules, and a receiver node 602, which includes a number of optical reception modules.

Here, for the transmitter node and the receiver node, reference can be made to the related description of the MIMO communication method according to the embodiment of the present disclosure. In a specific implementation, each optical transmission module in the transmitter node may be an LED. Each optical reception module in the receiver node may be a PD.

Figure 7:
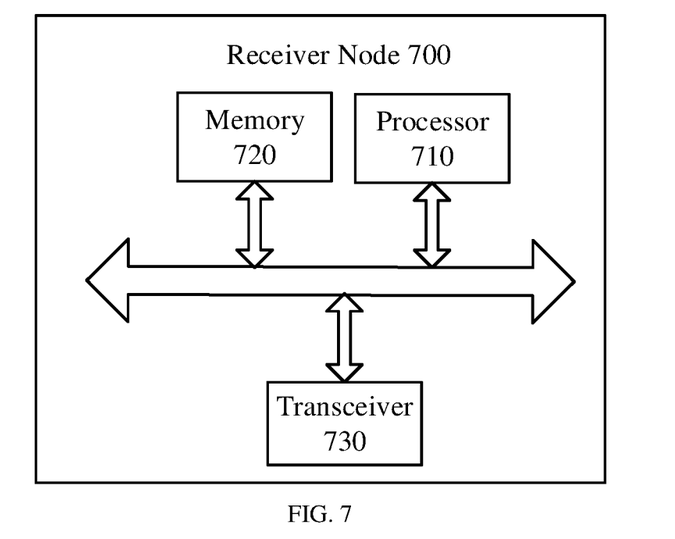
FIG. 7 is a schematic diagram showing a structure of a receiver node according to an embodiment of the present disclosure.

FIG. 7 is a schematic diagram showing a structure of a receiver node 700 according to an embodiment of the present disclosure. The receiver node 700 shown in FIG. 7 includes a processor 710, and the processor 710 can invoke and execute a computer program from a memory to implement the method according to any of the embodiments of the present disclosure.

Optionally, as shown in FIG. 7, the receiver node 700 may further include a memory 720. The processor 710 can invoke and execute a computer program from the memory 720 to implement the method according to any of the embodiments of the present disclosure.

The memory 720 may be a separate device independent of the processor 710, or may be integrated in the processor 710.

Optionally, as shown in FIG. 7, the receiver node 700 may further include a transceiver 730. The processor 710 can control the transceiver 730 to communicate with other devices, and in particular to transmit information or data to other devices or receive information or data transmitted by other devices.

Here, the transceiver 730 may include a transmitter node and a receiver node. The transceiver 730 may further include one or more antennas.

Optionally, the receiver node 700 may be a terminal device, such as a notebook computer, a mobile phone, a tablet computer, or the like, and the receiver node 700 can implement the procedure in the method according to any of the embodiments of the present disclosure. Details thereof will be omitted here for simplicity.

Figure 8:
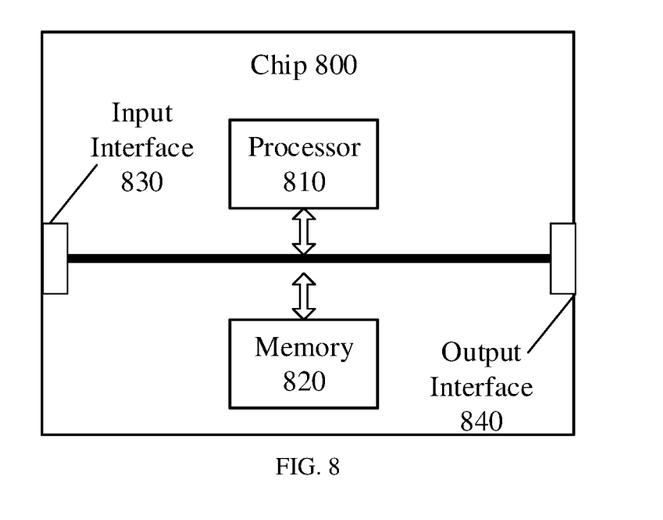
FIG. 8 is a schematic diagram showing a structure of a chip according to an embodiment of the present disclosure.

FIG. 8 is a schematic diagram showing a structure of a chip 800 according to an embodiment of the present disclosure. The chip 800 shown in FIG. 8 includes a processor 810, and the processor 810 can invoke and execute a computer program from a memory to implement the method in the embodiments of the present disclosure.

Optionally, as shown in FIG. 8, the chip 800 may further include a memory 820. The processor 810 can invoke and execute a computer program from the memory 820 to implement the method in the embodiments of the present disclosure.

The memory 820 may be a separate device independent from the processor 810, or may be integrated in the processor 810.

Optionally, the chip 800 may further include an input interface 830. The processor 810 can control the input interface 830 to communicate with other devices or chips, and in particular, obtain information or data transmitted by other devices or chips.

Optionally, the chip 800 may further include an output interface 840. The processor 810 can control the output interface 840 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding process implemented by the mobile terminal/terminal device in each method of the embodiment of the present disclosure. For the sake of brevity, details thereof will be omitted here.

It can be appreciated that the chip in the embodiment of the present disclosure may be a chip, and the chip may also be referred to as a system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium having a computer program stored thereon.

Optionally, the computer readable storage medium can be applied in the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied in the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied in the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied in the network device in the embodiment of the present disclosure. The computer program, when executed by a computer, can cause the computer to perform corresponding procedures implemented by the network device in the method according to any of the embodiments of the present disclosure. Details thereof will be omitted here for simplicity.

Optionally, the computer program can be applied in the mobile terminal/terminal device in the embodiment of the present disclosure. The computer program, when executed by a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A Multiple Input Multiple Output (MIMO) communication method, comprising:
   receiving, by a number of optical detection modules of a receiver node, optical signals transmitted by a number of optical transmission modules of a transmitter node, wherein different optical detection modules of the receiver node have different orientations, and different optical transmission modules of the transmitter node have different orientations,
   wherein the optical signals received by the number of optical detection modules of the receiver node are a first signal, and the optical signals transmitted by the number of optical transmission modules of the transmitter node are a second signal, and wherein the method further comprises:
   determining, by the receiver node, channel gain information between the receiver node and the transmitter node, and determining a relationship between the first signal and the second signal based on the channel gain information.

2. The method according to claim 1, wherein said determining, by the receiver node, the channel gain information between the receiver node and the transmitter node comprises:
   determining, by the receiver node, a channel gain matrix between the receiver node and the transmitter node as:

$$H = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{N_R 1} & h_{N_R 2} & \cdots & h_{N_R N_T} \end{bmatrix},$$

where H represents the channel gain matrix, an element $h_{ij}$ in H represents a channel gain value between a j-th optical transmission module of the number of optical transmission modules and an i-th optical detection module of the number of optical detection modules, $1 \leq j \leq N_T$ and j is an integer, and $1 \leq i \leq N_R$ and i is an integer, $N_T$ represents the number of optical transmission modules, and $N_R$ represents the number of optical detection modules.

3. The method according to claim 2, wherein said determining, by the receiver node, the channel gain information between the receiver node and the transmitter node further comprises:
   determining, by the receiver node, the element $h_{ij}$ in the channel gain matrix as:

$$h_{ij} = \begin{cases} \dfrac{1 - |\vec{AB}|\left(|\vec{AB}|^2 + \dfrac{S_{Ri}\cos\xi_{Ri}}{\pi}\right)^{-1/2}}{1 - \cos\dfrac{\beta_{Tj}}{2}} & \xi_{Tj} \leq \dfrac{\beta_{Tj}}{2} \text{ and } \xi_{Ri} \leq \dfrac{\beta_{Ri}}{2}, \\ 0 & \text{else} \end{cases}$$

where $\vec{AB}$ represents a vector from Point A to Point B, Point A being a position of the j-th optical transmission module and Point B being a position of the i-th optical detection module, $|\vec{AB}|$ represents a modulus length of $\vec{AB}$, $S_{Ri}$ represents a detection area of the i-th optical detection module, $\xi_{Tj}$ represents an angle between $\vec{AB}$ and $\vec{e}_{Tj}$, $\xi_{Ri}$ represents an angle between $\vec{e}_{Ri}$ and $\vec{BA}$, $\vec{e}_{Tj}$ represents an unit vector in an orientation of the j-th optical transmission module, $\vec{e}_{Ri}$ represents an unit vector in an orientation of the i-th optical detection module, $\beta_{Tj}$ represents a beam divergence angle of the j-th optical transmission module, and $\beta_{Ri}$ represents a field angle of the i-th optical detection module.

4. The method according to claim 2, wherein said determining, by the receiver node, the channel gain information between the receiver node and the transmitter node further comprises:
   determining, by the receiver node, the element $h_{ij}$ in the channel gain matrix as:

$$h_{ij} = \sum_{k=1}^{K} \int_0^{+\infty} h_{ij}^{(k)}(t; S, R) dt,$$

where $h_{ij}^{(k)}(t;S,R)$ represents an impulse response component of a k-th reflection from a light source S to a receiving end R, and K represents a total number of reflections, the light source S being the j-th optical transmission module, and the receiving end R being the i-th optical detection module.

5. The method according to claim 4, wherein the impulse response component of the k-th reflection from the j-th optical transmission module to the i-th optical detection module is:

$$h_{ij}^{(k)}(t; S, R) = \sum_{l=1}^{N} \rho h_{ij}^{(k-1)}(t; S, \varepsilon_l^r) * h_{ij}^{(0)}(t; \varepsilon_l^s, R),$$

where $h_{ij}^{(k-1)}(t;S,\varepsilon_l^r)$ represents an impulse response of a (k−1)-th reflection from the light source S to a reflection surface element $\varepsilon_l^r$, $h_{ij}^{(0)}(t;\varepsilon_l^s,R)$ represents an impulse response of an LoS link from a reflection surface element $\varepsilon_l^s$ to the receiving end R, $\rho$ represents an average reflectivity of the reflection surface elements, and N represents a total number of reflection surface elements.

6. The method according to claim 2, wherein said determining the relationship between the first signal and the second signal based on the channel gain information comprises:
   determining, based on the channel gain information, the relationship between the first signal and the second signal as:

$y=Hs+n$, where n represents a white Gaussian noise vector, y represents the first signal, s represents the second signal, and H represents the channel gain matrix.

7. The method according to claim 6, further comprising:
   demodulating, by the receiver node, the first signal to obtain a demodulated signal as:

$\hat{x}=Wy$, where $\hat{x}$ represents the demodulated signal, W represents a demodulation weight matrix, and y represents the first signal.

8. The method according to claim 7, wherein the demodulation weight matrix is:

$$W=(H^TH+\sigma^2 I)^{-1}H^T,$$

where H represents the channel gain matrix, $\sigma^2$ represents a variance of n, and I is an identity matrix.

9. The method according to claim 1, wherein:
each of the number of optical transmission modules has an adjustable orientation and/or an adjustable beam divergence angle; or
each of the number of optical detection modules has an adjustable orientation and/or an adjustable field angle.

10. A receiver node, comprising:
a number of optical detection modules of a receiver node;
a memory having a computer program stored thereon; and
a processor configured to invoke and execute the computer program stored in the memory to cause the receiver node to:
receive, by the number of optical detection modules of the receiver node, optical signals transmitted by a number of optical transmission modules of a transmitter node, wherein different optical detection modules of the receiver node have different orientations, and different optical transmission modules of the transmitter node have different orientations,
wherein the optical signals received by the number of optical detection modules of the receiver node are a first signal, and the optical signals transmitted by the number of optical transmission modules of the transmitter node are a second signal, and
wherein the processor is further configured to invoke and execute the computer program stored in the memory to cause the receiver node to: determine channel gain information between the receiver node and the transmitter node, and determine a relationship between the first signal and the second signal based on the channel gain information.

11. The receiver node according to claim 10, wherein the processor is further configured to invoke and execute the computer program stored in the memory to cause the receiver node to: determine a channel gain matrix between the receiver node and the transmitter node as:

$$H = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{N_R 1} & h_{N_R 2} & \cdots & h_{N_R N_T} \end{bmatrix},$$

where H represents the channel gain matrix, an element $h_{ij}$ in H represents a channel gain value between a j-th optical transmission module of the number of optical transmission modules and an i-th optical detection module of the number of optical detection modules, $1 \le j \le N_T$ and j is an integer, and $1 \le i \le N_R$ and i is an integer, $N_T$ represents the number of optical transmission modules, and $N_R$ represents the number of optical detection modules.

12. The receiver node according to claim 11, wherein the processor is further configured to invoke and execute the computer program stored in the memory to cause the receiver node to: determine the element $h_{ij}$ in the channel gain matrix as:

$$h_{ij} = \begin{cases} \dfrac{1 - |\overrightarrow{AB}|\left(|\overrightarrow{AB}|^2 + \dfrac{S_{Ri}\cos\xi_{Ri}}{\pi}\right)^{-1/2}}{1 - \cos\dfrac{\beta_{Tj}}{2}} & \xi_{Tj} \le \dfrac{\beta_{Tj}}{2} \text{ and } \xi_{Ri} \le \dfrac{\beta_{Ri}}{2}, \\ 0 & \text{else} \end{cases}$$

where $\overrightarrow{AB}$ represents a vector from Point A to Point B, Point A being a position of the j-th optical transmission module and Point B being a position of the i-th optical detection module, $|\overrightarrow{AB}|$ represents a modulus length of $\overrightarrow{AB}$, $S_{Ri}$ represents a detection area of the i-th optical detection module, $\xi_{Tj}$ represents an angle between $\overrightarrow{AB}$ and $\vec{e}_{Tj}$, $\xi_{Ri}$ represents an angle between $\vec{e}_{Ri}$ and $\overrightarrow{BA}$, $\vec{e}_{Tj}$ represents an unit vector in an orientation of the j-th optical transmission module, $\vec{e}_{Ri}$ represents an unit vector in an orientation of the i-th optical detection module, $\beta_{Tj}$ represents a beam divergence angle of the j-th optical transmission module, and $\beta_{Ri}$ represents a field angle of the i-th optical detection module.

13. The receiver node according to claim 11, wherein the processor is further configured to invoke and execute the computer program stored in the memory to cause the receiver node to: determine the element $h_{ij}$ in the channel gain matrix as:

$$h_{ij} = \sum_{k=1}^{K} \int_0^{+\infty} h_{ij}^{(k)}(t; S, R)dt,$$

where $h_{ij}^{(k)}(t;S,R)$ represents an impulse response component of a k-th reflection from a light source S to a receiving end R, and K represents a total number of reflections, the light source S being the j-th optical transmission module, and the receiving end R being the i-th optical transmission module.

14. The receiver node according to claim 13, wherein the impulse response component of the k-th reflection from the j-th optical transmission module to the i-th optical detection module is:

$$h_{ij}^{(k)}(t; S, R) = \sum_{l=1}^{N} \rho h_{ij}^{(k-1)}(t; S, \varepsilon_l^r) * h_{ij}^{(0)}(t; \varepsilon_l^s, R),$$

where $h_{ij}^{(k-1)}(t;S,\xi_l^r)$ represents an impulse response of a (k−1)-th reflection from the light source S to a reflection surface element $\varepsilon_l^r$, $h_{ij}^{(0)}(t;\varepsilon_l^s,R)$ represents an impulse response of an LoS link from a reflection surface element $\varepsilon_l^s$ to the receiving end R, $\rho$ represents an average reflectivity of the reflection surface elements, and N represents a total number of reflection surface elements.

15. The receiver node according to claim 11, wherein the processor is further configured to invoke and execute the computer program stored in the memory to cause the receiver node to: determine, based on the channel gain information, the relationship between the first signal and the second signal as:

$$y=Hs+n,$$

where n represents a white Gaussian noise vector, y represents the first signal, s represents the second signal, and H represents the channel gain matrix.

16. The receiver node according to claim 15, wherein the processor is further configured to invoke and execute the computer program stored in the memory to cause the receiver node to: demodulate the first signal to obtain a demodulated signal as:

$$\hat{x} = Wy,$$

where $\hat{x}$ represents the demodulated signal, W represents a demodulation weight matrix, and y represents the first signal.

17. The receiver node according to claim 16, wherein the demodulation weight matrix is:

$$W = (H^T H + \sigma^2 I)^{-1} H^T,$$

where H represents the channel gain matrix, $\sigma^2$ represents a variance of n, and I is an identity matrix.

18. The receiver node according to claim 10, wherein each of the number of optical transmission modules or each of the number of optical detection modules has an adjustable orientation and/or an adjustable beam divergence angle.

* * * * *